(12) United States Patent
Liang et al.

(10) Patent No.: US 11,657,215 B2
(45) Date of Patent: *May 23, 2023

(54) ROBUST EXPANDABLE DIALOGUE SYSTEM

(71) Applicant: Microsoft Technology Licensing, LLC, Redmond, WA (US)

(72) Inventors: Percy Shuo Liang, Palo Alto, CA (US); David Leo Wright Hall, Berkeley, CA (US); Jesse Daniel Eskes Rusak, Somerville, MA (US); Daniel Klein, Orinda, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,289

(22) Filed: Sep. 21, 2021

(65) Prior Publication Data

US 2022/0004702 A1 Jan. 6, 2022

Related U.S. Application Data

(63) Continuation of application No. 16/115,491, filed on Aug. 28, 2018, now Pat. No. 11,132,499.

(Continued)

(51) Int. Cl.
| | | |
|---|---|---|
| *G10L 15/06* | (2013.01) | |
| *G06F 40/169* | (2020.01) | |
| *G10L 15/16* | (2006.01) | |
| *G10L 15/02* | (2006.01) | |
| *G10L 15/183* | (2013.01) | |
| *G10L 15/07* | (2013.01) | |

(52) U.S. Cl.
CPC ............ *G06F 40/169* (2020.01); *G10L 15/02* (2013.01); *G10L 15/063* (2013.01); *G10L 15/16* (2013.01); *G10L 15/183* (2013.01); *G10L 15/06* (2013.01); *G10L 15/075* (2013.01); *G10L 2015/0631* (2013.01); *G10L 2015/0638* (2013.01)

(58) Field of Classification Search
None
See application file for complete search history.

(56) References Cited

U.S. PATENT DOCUMENTS 9,812,127 B1 * 11/2017 Perez ...................... G10L 15/22
10,896,670 B2 * 1/2021 Eisenzopf ............... H04L 51/02

(Continued)

FOREIGN PATENT DOCUMENTS

| CN | 1417679 A | 5/2003 |
|---|---|---|
| CN | 101287042 A | 10/2008 |

(Continued)

OTHER PUBLICATIONS

"Office Action Issued in Indian Patent Application No. 201917032035", dated Jan. 6, 2022, 7 Pages.

(Continued)

*Primary Examiner* — Richard Z Zhu
(74) *Attorney, Agent, or Firm* — Alleman Hall Creasman & Tuttle LLP

(57) ABSTRACT

An automated natural dialogue system provides a combination of structure and flexibility to allow for ease of annotation of dialogues as well as learning and expanding the capabilities of the dialogue system based on natural language interactions.

20 Claims, 5 Drawing Sheets

Related U.S. Application Data

(60) Provisional application No. 62/613,995, filed on Jan. 5, 2018, provisional application No. 62/554,456, filed on Sep. 5, 2017, provisional application No. 62/551,200, filed on Aug. 28, 2017.

(56) References Cited

U.S. PATENT DOCUMENTS

| | | | |
|---|---|---|---|
| 10,997,968 B2* | 5/2021 | Wanas | G06F 40/295 |
| 2013/0124195 A1 | 5/2013 | Ehsani et al. | |
| 2018/0203833 A1 | 7/2018 | Liang et al. | |
| 2018/0232436 A1* | 8/2018 | Elson | G06Q 10/10 |
| 2018/0246954 A1 | 8/2018 | Andreas et al. | |
| 2018/0261205 A1 | 9/2018 | Liang et al. | |
| 2018/0350349 A1 | 12/2018 | Liang et al. | |
| 2019/0066660 A1 | 2/2019 | Liang et al. | |
| 2019/0103092 A1 | 4/2019 | Rusak et al. | |
| 2020/0193970 A1 | 6/2020 | Liang et al. | |
| 2022/0093081 A1 | 3/2022 | Liang et al. | |

FOREIGN PATENT DOCUMENTS

| | | |
|---|---|---|
| CN | 101536084 A | 9/2009 |
| CN | 101939740 A | 1/2011 |
| CN | 102236645 A | 11/2011 |
| CN | 102750271 A | 10/2012 |
| CN | 104871150 A | 8/2015 |
| KR | 20130128717 A | 11/2013 |

OTHER PUBLICATIONS

"Office Action Issued in Chinese Patent Application No. 201780067955. 0", dated Dec. 1, 2022, 15 Pages.

Yang, et al., "A Survey on Task-Oriented Dialogue Systems", In Chinese Journal of Computers Volume, 43, Issue 10, Oct. 31, 2020, pp. 1862-1896.

"First Office Action and Search report Issued in Chinese Patent Application No. 201880012230.6", dated Oct. 10, 2022, 11 Pages.

Kalatzis, et al., "Bootstrapping incremental dialogue systems: using linguistic knowledge to learn from minimal data", In Repository of arXiv:1612.00347v1, Dec. 1, 2016, 4 Pages.

"First Office Action and Search report Issued in Chinese Patent Application No. 201880010431.2", dated Nov. 15, 2022, 17 Pages.

* cited by examiner

US 11,657,215 B2

ROBUST EXPANDABLE DIALOGUE SYSTEM

CROSS REFERENCE TO RELATED APPLICATIONS

This application is a continuation from U.S. Non-Provisional patent application Ser. No. 16/115,491, filed Aug. 28, 2018, which claims priority to U.S. Provisional Patent Application Ser. No. 62/551,200, filed Aug. 28, 2017; U.S. Provisional Patent Application Ser. No. 62/554,456, filed Sep. 5, 2017; and U.S. Provisional Patent Application Ser. No. 62/613,995, filed Jan. 5, 2018; the entire contents of each of which are hereby incorporated herein by reference for all purposes.

DETAILED DESCRIPTION

The present technology, roughly described, includes a dialogue system that allows non-engineer administrators, without programming, machine language, or artificial intelligence system knowledge, to expand the capabilities of the dialogue system. The dialogue system provides a combination of structure and flexibility to allow for ease of annotation as well as learning.

The dialogue system may have a knowledge system, user interface, and learning model system. The knowledge system may define a small set of primitives and a simple language that allows for computing a wide range of results. The user interface allows non-experts to create dialogues by writing utterances and sequences of actions in a simple language. The learning system can learn from this type of supervision to generalize new dialogues. The dialogue system architecture is simple and modular so that it can be scaled and adapted to particular needs.

The dialogue system allows for data annotation to be scalable while allowing data collection to be decoupled from model building. Data annotation is designed to have a minimal burden on annotators, such that annotation tasks are simple. Annotators are not required to provide a piece of information that can be easily imputed by the dialogue system. Annotators can provide the dialogue system with the desired behavior of the dialogue system, even if the dialogue system is not capable of producing this behavior. Additionally, annotators can directly express high-level intent to ensure data consistency to decouple competence and performance.

Figure 1:
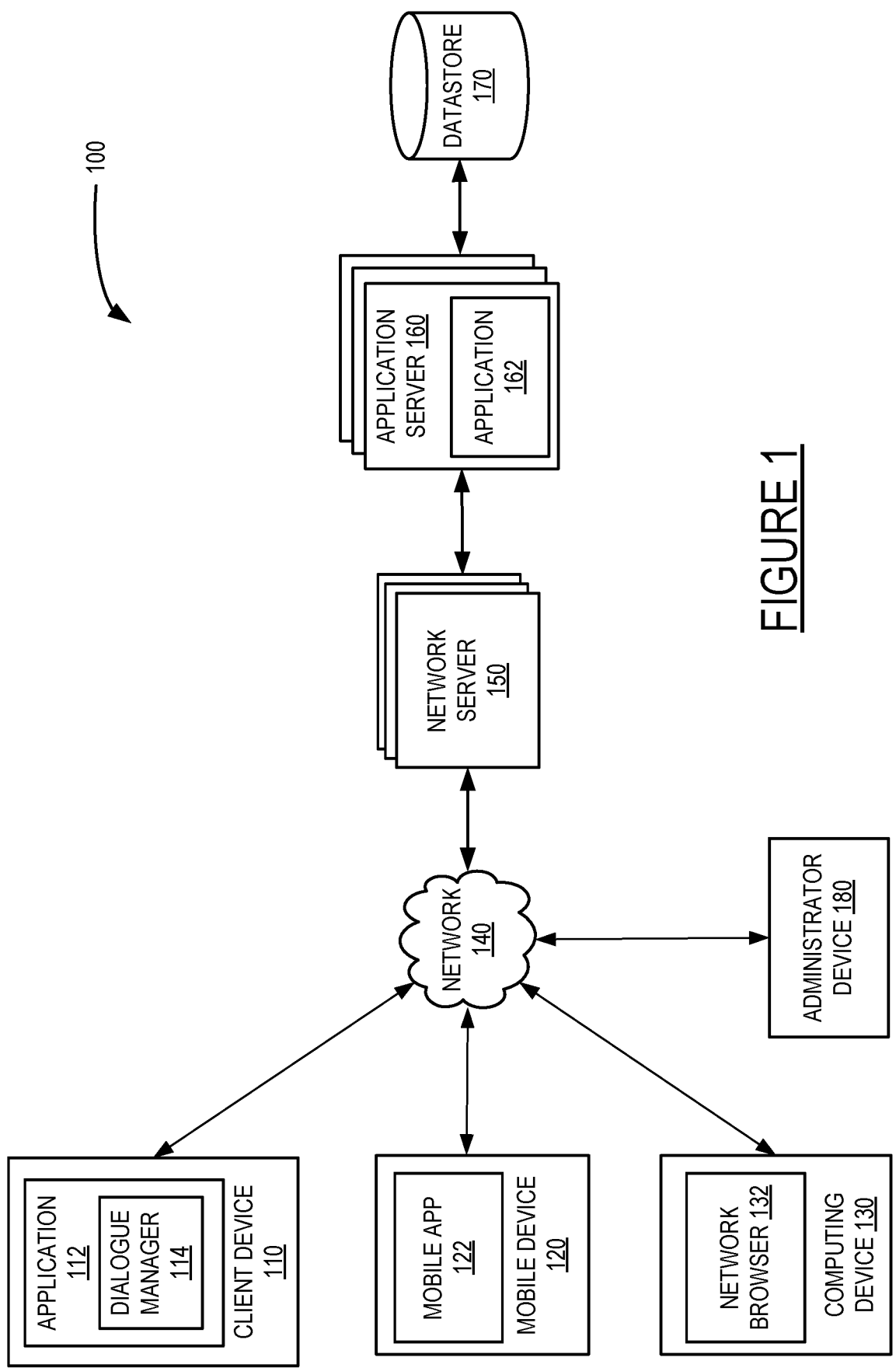
FIG. 1 is a block diagram of a computing system that implements a dialogue manager.

FIG. 1 is a block diagram of an example computerized automated dialogue system that implements a computerized dialogue manager. Dialogue system 100 of FIG. 1 includes client device 110, mobile device 120, computing device 130, network 140, network server 150, application server 160, and data store 170. Client device 110, mobile device 120, and computing device 130 communicate with network server 150 over network 140. Network 140 may include a private network, public network, the Internet, an intranet, a WAN, a LAN, a cellular network, or some other network suitable for the transmission of data between computing devices of FIG. 1.

Client device 110 includes application 112. Application 112 may provide a dialogue manager 114 that allow non-expert annotators to expand the functionality of the dialogue system, and/or other functionality discussed herein. Application 112 may be implemented as one or more applications, objects, modules, and/or other software and/or instantiated logic. Application 112 may communicate with application server 160 and data store 170, through the server architecture of FIG. 1 or directly (not illustrated in FIG. 1) to access the large amounts of data. Application 112 may be a logic machine that may include one or more different computers cooperatively configured to provide the functionality described herein.

Mobile device 120 may include a mobile application 122. The mobile application may provide at least a portion of the functionality described with respect to application 112. Mobile application 122 may be implemented as one or more applications, objects, modules, and/or other software or instantiated logic, and may operate to provide services in conjunction with application server 160. For example, mobile application 122 may be a logic machine that may include one or more different computers cooperatively configured to provide the functionality described herein.

Computing device 130 may include a network browser 132. The network browser may receive one or more content pages, script code, and other code that when loaded into the network browser implement at least a portion of the functionality described with respect to application 112. The content pages may operate to provide services in conjunction with application server 160. Network browser 132 may be implemented as one or more applications, objects, modules, and/or other software or instantiated logic, and may operate to provide services in conjunction with application server 160. For example, network browser 132 may be a logic machine that may include one or more different computers cooperatively configured to provide the functionality described herein.

Network server 150 may receive requests and data from application 112, mobile application 122, and network browser 132 via network 140. The request may be initiated by the particular applications, browser, or by a dialogue manager implemented by an application and/or browser. Network server 150 may process a request and data, generate and transmit a response, or transmit the request, data, and any other content to application server 160 for processing.

Application server 160 may receive data, including data requests received from applications 112 and 122 and network browser 132, process the data, and transmit a response to network server 150. In some implementations, the responses are forwarded by network server 152 to the computer or application that originally transmitted the request. Application server 160 may also communicate with data store 170. For example, data can be accessed from data store 170 to be used by a dialogue manager to expand the functionality of the dialogue system. Application server 160 includes application 162, which may operate similar to application 112 except implemented all or in part on application server 160. Application 162 may be implemented as one or more applications, objects, modules, and/or other software or instantiated logic, and may operate to provide services in conjunction with one or more of client device 110, mobile device 120, and computing device 130. For example, application 162 may be a logic machine that may include one or more different computers cooperatively configured to provide the functionality described herein.

An administrator device 180 may access a dialogue manager directly through client device 110, mobile device 120 or computing device 130 or by accessing an application server. The administrator device 180 may access the dialogue manager to provide input into a user interface provided by the dialogue manager 114 in order to expand the capability of a dialogue system. The dialogue system may be stored and executed on any client device, mobile device, computing device, administrator device or application server of FIG. 1, and may provide a virtual or intelligent assistant that completes tasks in response to user utterances.

Figure 2:
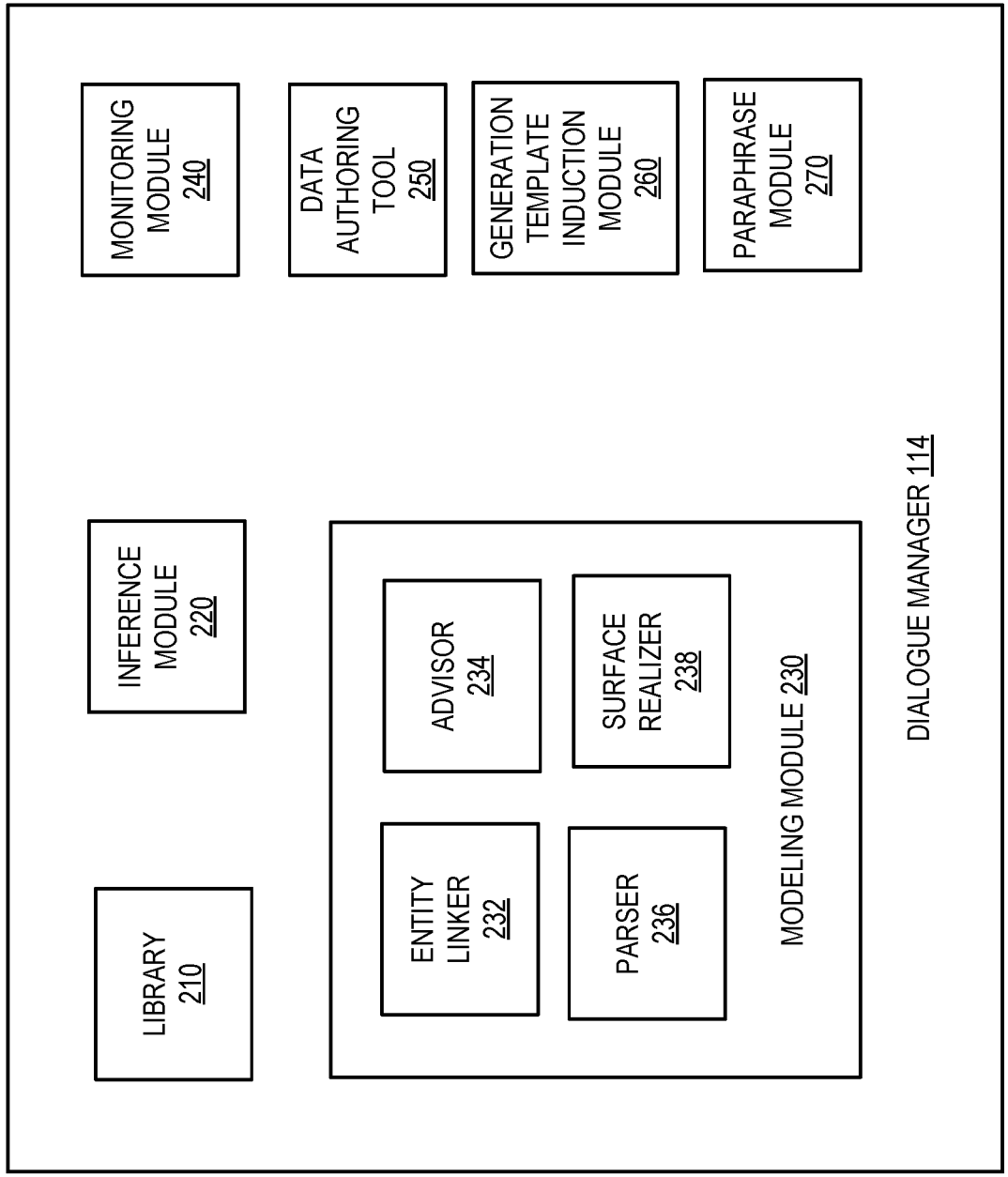
FIG. 2 is a block diagram of example modules that implement a dialogue manager.

FIG. 2 is a block diagram of example modules that may be used to implement the dialogue manager 114 of FIG. 1. Application 112 of client device 110, mobile application 122 of mobile device 120, network browser 132 of computing device 130, and/or application 162 of server 160 (generally, computerized automated dialogue system 100) may implement one or more of the modules of dialogue manager 114, for example. In some examples, the modules of dialogue manager 114 may be implemented as software executed on suitable computer hardware (e.g., including one or more of a suitable logic device such as a processor, input device(s), output device(s), memory) or as instantiated logic. The dialogue manager 114 may include library 210, inference module 220, modeling module 230, monitoring module 240, data authoring tool 250, generation template induction module 260, and paraphrase module 270. The modules may communicate with each other as being on the same machine or on different actual or logic machines. The dialogue manager is a logic machine that may include one or more different computers cooperatively configured to provide the functionality described herein. Similarly, each component of dialogue manager 114 (e.g., library 210, inference module 220, modeling module 230, monitoring module 240, data authoring tool 250, generation template induction module 260, and paraphrase module 270) and each sub-component thereof may be implemented as one or more logic machines.

Varying portions of dialogue manager 114 may be implemented locally and/or remotely—for example, a dialogue manager may be entirely implemented on hardware that is local to a user. In other examples, a portion of a dialogue manager may be implemented on local hardware, while another portion of the dialogue manager is implemented on remote hardware (e.g., on a cloud computing service communicatively coupled to the local hardware)—e.g., the local portion of the dialogue manager may perform speech recognition and parsing of user utterances recorded locally, and perform text-to-speech conversion for replies to the user, while the remote portion of the dialogue manager may determine actions congruent with the user utterances. As another example, a remote portion of a dialogue manager may perform substantially all functions associated with user utterance processing and reply generation, while local hardware may record user utterances and output replies. Generally, dialogue manager 114 may be distributed locally and/or remotely in any suitable manner. Though illustrated in a single application in FIG. 2, the modules 210-270 may be implemented on one or more applications of one or more machines. For example, the dialogue manager 114 may be distributed over several back-end application servers 160, distributed on both one or more back-end application servers 160 and a remote device (e.g., client device 110, mobile device 120, computing device 130, administrator device 180), entirely on a remote device such as one of devices 110-130 and 180, or in some other manner. Additionally, the present technology may be implemented with more or fewer modules, which collectively implement all or a portion of the technology and features discussed herein.

The dialogue manager 114 may have structural components such as library 210, inference module 220, and monitoring model 240. The library 210 can include basic types, such as measurements and dates, as well as functions (e.g., filter, max) sufficient to easily perform any suitable derived computation given the results of API calls. The inference module 220 maps requests to raw API calls (e.g., FlightSearch to QPX). In one example, requests are mapped to API calls that are parameterized by a declarative specification of a schema of the dialogue system.

The modeling module 230 may include components such as an entity linker 232, one or more advisors 234, a parser 236, and a surface realizer 238. Each component may perform mapping of content in some manner. For example, entity linker 232 can map content such as dialogue or an input utterance to values that occur in the utterance (e.g., "nyc" to "New York City"). Advisor 234 maps content such as dialogue, input, and a candidate action sequence to advice (e.g., "dialogue manager should ask about departure date"). Advice is a structured version of features in ordinary machine learning that provides inductive bias to the model. Advice should be easy to write down but hard to learn. Advisors can also be learned on external data. Parser 236 maps (dialogue, input) to a sequence of actions (e.g., perform_flight_search). Parser 236 is driven by a neural model that is learned from example dialogues, and leverages entity linker 232 and advisor(s) 234. Surface realizer 238 maps generation tokens and entities to an utterance string (e.g., "Ok, leaving [2017-06-24]" ⇒ "Ok, leaving Sat, June 24." Surface realizer 238 may handle some pragmatic choices around realizing entities (e.g., United flight ⇒ realizing United is an airline company).

With these structural components in mind, the structure of the dialogue system adheres to several principles. First, developers of the dialogue system can declaratively write the schema for a new domain and have a usable dialogue system operating very quickly if the new domain is structurally similar to an existing domain. Additionally, the dialogue system can indicate what it did, so that the user and dialogue system have common ground. Therefore, the space of possible system outputs can be sanitized, for example checked by annotators. Developers can write down custom business logic, such as for example 'always confirm identity before sharing account information,' or 'always confirm before booking a flight.' To keep learning tractable, the number of long-range dependencies that the model needs to navigate can be minimized, and the dialogue system can record inductive biases, for example via one or more advisors. In some instances, there can be high-level hooks to record inductive biases (e.g., it must be evident from the dialogue whether the user's identity was confirmed or not).

In addition to the structural components, there may be other parts to the dialogue system. These additional parts may include monitoring module 240, data authoring tool 250, generation template induction module 260, and paraphrasing module 270. Monitoring module 240 can allow for monitoring what phenomena are being covered and generate human worker (e.g., Turk) tasks to produce more coverage. Data authoring tool 250 can allow annotators to create dialogues quickly using model-based autocomplete and validation. More information for a data authoring tool is described in U.S. patent application Ser. Nos. 15/904,125 and 15/974,650, the contents of each of which are hereby incorporated herein by reference for all purposes. Generation template induction module 260, when given raw actions that return a dialogue manager utterance, extract generation macros with some precondition actions (which need to be refined). Generation template induction module 260 also allows annotators to edit and sanitize these templates (e.g., There are no flights.). Paraphrasing module 270 can create a process for obtaining a huge number of high quality paraphrases of utterances in the domain. More detail for paraphrasing is described in U.S. patent application Ser. No. 15/669,795, the contents of which is hereby incorporated herein by reference for all purposes.

The dialogue system may have several concepts and definitions associated with its design and operation as described herein. For example, a dialogue can contain a sequence of turns, where each turn consists of a context, user input, and a sequence of dialogue manager actions. A context includes the current time and location and any user information such as contacts (which might change over the course of the dialogue). An input can be an utterance (e.g., "book that flight"), but could also be more structured (e.g., button click), or something from the environment (e.g., email arrived, flight search came back). An action is something the dialogue manager takes in response to input. Each action produces a new value and possibly depends on previous values. There can be several types of actions used and/or taken by the dialogue system. A macro consists of a name (e.g., city_to_airport), a type signature (e.g., arg: City), and a body. The body is a sequence of actions that can refer to any of the arguments in the type signature. A template is a macro along with the arguments filled in by generalized paths, where a generalized path deterministically fetches the appropriate value (e.g., Flight[−1]). This is used primarily for generating dialogue manager responses, where the behavior needs to be sanitized. A request is a value that intuitively represents a database operation. The request gets incrementally built up over time (e.g., FlightSearch) and can include constraints. A result is like a list of database rows that gets returned (e.g., Flight) as a result of performing a request.

The modules and/or logic of the dialogue system may utilize values and actions. A value can be a primitive value (e.g., 3:Number), a list value with elements of type T (e.g., list of Flight's), a constraint value on values of type T (e.g., >=3), or a structured value, which includes an ordered list of key-value pairs (e.g., a FlightSearch). The list of values produced by actions is considered the root value, while a (concrete, as opposed to generalized) path is used to reference a sub-value starting from the root value. These are the arguments to call and macro actions. For example, a root and sub-value may be expressed as [30].parts.[0].departure date.

There are several types of actions, including primitive actions, call actions, and macro actions. A primitive action returns a verbatim value, such as for example "Boston":City. A call action includes a function and a list of arguments of previous values. The basic version returns the result of calling that function, such as for example perform_flight_search([32]). If an output path is specified, then the structured value corresponding to the root of the output path is returned with the output path set to the result of the function call, such as for example [32].parts.[0].departure_date=identity(2017-03-04) or get_time ([30].parts.[0].departure date). If the output path and input paths have wildcards '*', then the dialogue system can perform a map, with '*' filled in with 0, 1, 2, and so on.

Some functions depend on the context as input (e.g., now( ) gets the current time). Some functions write to the context as output (e.g., adding a contact). This can be used to simulate contacts logic. When an external API is used for managing contacts, then the dialogue system can record the live trace and write down the sequence of requests (e.g., if the dialogue system adds Bob to contacts, then listing contacts will return Bob+other people). If the dialogue system tries to invoke the requests to the service out of order, the dialogue system simply get an error during training. A macro action, which includes a macro name and a list of arguments (like call action), and returns a value. Internally, a macro executes a sequence of actions. Macros provide a dynamic way of building higher-level abstractions.

A 'say' action, a special case of a 'call' action, that takes a list of token strings and values and causes the dialogue system to render that list into a form suitable for sending to an end user. An example of a say action is say ("to", "Boston":City, "(", "BOS":AirportCode, ")"). A say action can also take a structured value describing a UI element (e.g., a list of flights) to show. In some instances, say actions are visible to the user, for example after surface realization. Surface realization is described in more detail in U.S. patent application Ser. No. 15/892,194, the contents of which is hereby incorporated herein by reference for all purposes.

The capabilities of the dialogue system are determined by the space of functions. These functions are composed via a sequence of actions (e.g., lookup two prices and then add). The resulting sequence of actions, in some instances, is reminiscent of bytecode as in a virtual machine like the Java Virtual Machine, which is meant to be simple (easy to understand and work with) but powerful (can represent any sequence of computations). They system may utilize several function types, such as basic functions and request functions. Basic functions are standard functions in a programming language and are used to manipulate data. Examples of basic functions include +, −, contains, all, any, filter, extract, remove, and sort. An exemplary use of a function is subtract ([30].arrival_time, [30].departure_time).

The "bytecode" in the dialogue system may differ from the bytecode of a virtual machine for a programming language in that the dialogue system records a sequence of concrete, actually computed operations over a set of values, while a virtual machine's bytecode is instructions for potential computations over values that are generally not (entirely) present.

Request functions, such as for example create_flight_search or perform_flight_search, create a request object (e.g., FlightSearch), modify the fields of that request object, and perform the request to get back a list of results. The process can be considered analogous to building up or editing a function call over the course of a dialogue. For example, a room rental request may look something as follows: location: Constraint[BoundingBox], checkin: Constraint[Datetime], checkout: Constraint[Datetime].

Note that the bytecode representation itself is a very procedural one: actions are simply executed, nothing more or less. The rationale for this is both transparency for the annotator (when a user clicks or otherwise provides input to select a search, the user receives a list of results, like in a web browser) as well as having a simpler inference procedure in the backend (just execute forward). When the annotator mutates the representation, it's clear what the local changes will be.

However, language itself specifies declarative constraints (e.g., "I don't want to fly on Tuesday"). Declarative constraints require inference (rather than simple execution), so to maintain tractability, they are encapsulated inside request functions. An example may be: checkin: >=2017-07-5 and <=2017-07-10.

Each value has a type. There are domain-specific types such as Flight, but the dialogue system also can have an inventory of domain-general types (standard library) that the dialogue system supports properly. An example is as follows: Time: Datetime, Duration, Space: Geocode, BoundingBox, Measurements: Length, Money.

The dialogue system may use several types of requests. Requests can be built up and modified incrementally and capture the data state associated with various dialogue patterns. Some examples of requests include form-filling, querying, CRUD, and troubleshooting. A form-filling request can, for example, send an email (fields are values: to, from, subject, body) or authenticate a user (gathering name, birthdate, security question). A querying request may, for example, look up weather, flights, hotel accommodations, or may make a KB query, such as the "largest city in Africa." A CRUD request may include a create, read, update, or delete request. Examples of a CRUD request include managing emails, restaurant reservations, shopping list, calendar, and so forth. The create function can be form-filling, while a read function can be querying.

A troubleshooting request may obtain information about something. For example, a simplified PrinterDiagnosis troubleshooting request might have fields of model, purchase date, a symptoms list (e.g., not turning on, crashing) either from a list of codes or open-ended tags, and tests that have been done (e.g., light_color_after_reboot).

In some instances, a dialogue manager within the dialogue system can ask questions to get information about symptoms, and suggest tests to do based on a model of what has worked. For example, a combination of a Bayesian network and active information gathering. The dialogue can provide a helpful trace that can be used to update the diagnostics model.

In some instances, the present technology may utilize If This, Then That (IFTTT), a free web-based service used to create chains of simple conditional statements, called applets. An applet is triggered by changes that occur within other web services. IFTTT allows the dialogue system to create (trigger "if", action "then") pairs, such as for example "send me the weather report when it rains." Supporting arbitrary trigger and actions can be implemented by having a compositional intentional representation. In some instances, the dialogue system can get shallow IFTTTs by allowing triggers and actions to be single requests. An IFTTT request may have a trigger (e.g., WeatherSearch), a condition (e.g., tomorrow.status=rain), and an action (e.g., EmailMessage). The IFTTT request parameters as used in the present technology can be extended as needed based on the design of the dialogue system. Querying requests can be built on doing flat SQL queries over entities (e.g., Flight, Airbnb) with attributes (e.g., origin, departure_date). In some instances, the attributes themselves can be structured entities.

The binding between the request interface and the raw API should be specified declaratively. A fast and easy way of taking existing APIs and turning them into requests via the inference module is provided. Each request (e.g., FlightSearch) can include a set of attributes, some of which are themselves structured (e.g., FlightLeg). Each attribute can include a type (e.g., Datetime, Airport), can indicate whether this field is required, and include a priority that indicates in what order a dialogue manager would ask for things.

Each attribute can be encoded in the API in several ways, such as for example an upper bound (max_stops), lower and upper bound (earliest_departure, latest_departure_time), and lists of positive and negative (preferred_airlines, prohibited_airlines). In addition, a set of derived attributes (e.g., total length, non-stop), can be specified as well as other fields, such as offset, limit, and maximum number of queries. In some instances, the API for getting the detailed requests can be specified as well, as well as a custom conversion to the string format that the API accepts (which should be drawn from a common set of conversions—e.g. for dates). This declarative specification that supports requests and attributes can have a number of functions associated with it, such as for example "create_function" which creates an empty request and "perform_function" which performs the given request and returns a list of results.

In some instances, the dialogue system could declare the request and attribute logic in a JSON file. In some instances, the dialogue system could implement more customization, and therefore utilize shared libraries for performing the inference.

The inference module 220, given a request object with a set of constraints, figures out what raw API calls to make to get an outer bound. The inference module 220 can then perform post-filtering to carry out the user's result. In some instances, the inference module 220 can return an error indicating that it can't resolve the request.

The parser 236 operates to map dialogue state (such as for example context, dialogue, or input) to a sequence of actions. The raw dialogue and advice produced by the advisors can serve as a starting point. Then, the dialogue system can impose the locality inductive bias (recency and telescoping through a dataflow graph) to restrict attention to the most likely relevant parts of the dialogue.

The parser 236 may include an encoder and a decoder. The encoder and decoder may be implemented as recited in "Sequence to Sequence Learning with Neural Networks," by Ilya Sutskever, Oriol Vinyals, and Quoc V. Le, arXiv: 1409.3215 [cs.CL], a copy of which is available at https://arxiv.org/abs/1409.3215, the content of which is incorporated herein by reference. An encoder computes an embedding for each token of the utterances which take into account the entity linked at that token and global embedding based on advisors' output. An encoder may also compute an embedding for each values and sub-value in the state. The embedding may be based at least in part on the following: -the sequence of types of values from the current point to that place in the dialogue; path down from the root to the value (parts.[0].origin); contentfulness of the value (null/non-null, does it have 0, 1, 2+ elements); embedding of the value (especially for constraints) or features; any information that advisors output; embedding of utterance context (e.g., if user says "to Boston" and Boston is triggered from "Boston" and put into the dialogue state, then "to" will flow to that entity); embeddings from values connected along the data dependency graph: if Boston gets put into a field, then "to" gets propagated along; and embeddings from values connected along the soft match graph: if a Flight has origin Boston, and the utterance mentions Boston, then the utterance context flows to the origin Boston and thus to Flight (which helps us pick out the right flight).

A decoder can choose a function or macro or template (e.g., get_time) when decoding content. If the decoder chooses a function or macro, arguments are chosen by attending to values based on their embeddings (e.g., [34].departure_datetime). If a template is chosen, then arguments are given already. The decoder may also utilize a checklist when decoding content. An example of a checklist is described in "Globally Coherent Text Generation with Neural Checklist Models," Chloe Kiddon, Luke Zettlemoyer, Yejin Choi, Computer Science and Engineering, University of Washington.

Figure 3:
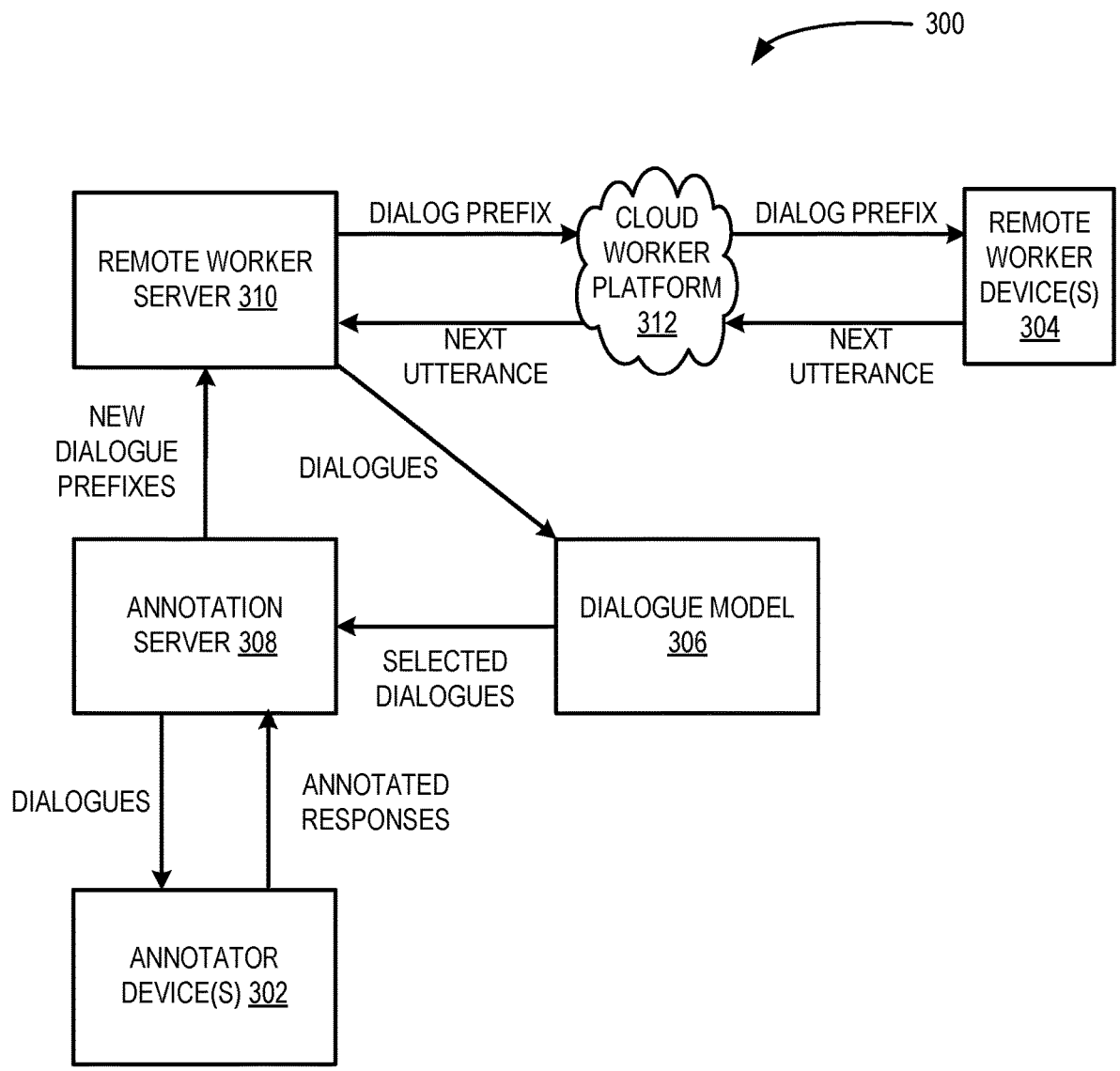
FIG. 3 is a block diagram of an example computing system for expanding the capabilities of a dialogue system.

The dialogue system may expand the capabilities of the machine learning dialogue model based on user interactions that generate dialogues that are annotated, evaluated, and may be used for retraining of the machine learning dialogue model. A beam search inspired approach can be implemented by the dialogue system to collect a large number of dialogues in parallel to expand on the capabilities of the dialogue system. FIG. 3 is a block diagram of an exemplary dialogue system 300 that employs a beam search approach for training and expanding the capabilities of the automated dialogue system. Initially, a plurality of different human users including annotators at annotator devices 302 and/or remote workers at remote worker devices 304 (e.g., real human users or workers on a platform like Amazon Mechanical Turk) are presented with a description of the domain (e.g., booking vacations or technical support for a printer) and potentially a description of a task (e.g., a particular kind of vacation or a particular problem with a printer) and are asked to start a natural language dialogue/conversation with a hypothetical conversational dialogue manager for this domain. Any suitable number of human users may interact with different instances of natural language dialogues to obtain a plurality of natural language dialogues/conversations.

A previously-trained, machine-learning dialogue model 306 selects a subset of utterances for the domain to present to the users in the instances of the natural language dialogue through a selection mechanism, e.g., randomly, based on uncertainty, or another metric as determined by the dialogue model. Any suitable number of one or more utterances may be included in the subset of utterances. In another example, the previously-trained, machine-learning dialogue model 306 may be executed on the utterances to generate responses and the responses may be presented to the users. Different subsets of utterances for the domain (and/or responses) may be presented to different users in different conversations/dialogues. The different users may provide user input responses to the subset of utterances. For example, a user input response provided by a remote worker at remote worker device 304 may be sent to remote worker server 310. The remote worker server 310 may send the utterances/responses in the different dialogues for the different users to the dialogue model 306. In some examples, human annotators and remote workers may interact with natural language dialogues to build out different instances of conversations for purposes of expanding the capabilities of the dialogue model. In some examples, users may be presented with different subsets of utterances/responses such that a large number of different instances of dialogues may be collected in parallel and evaluated according to the beam inspired search approach. Dialogue model 306 may be implemented as a logic machine that may include one or more different computers cooperatively configured to provide the functionality described herein.

Then, the dialogue system 300 presents these utterances/responses generated from the interactions with the human user in the natural language dialogues to the artificial intelligence teachers/annotators at the annotator devices 302 to annotate the utterances/responses with actions. The dialogue system then may retrain the machine-learning model 306 based on the new examples of interactions annotated with actions along with existing data. The dialogue system then presents human users (e.g., remote workers at the remote worker device 304) with a k-best list of utterances to choose from for each dialogue. For example, the dialogue system can provide a number of users with a partially completed dialogue (initially empty) and ask them to generate the next utterance or the most appropriate response/interaction. The remote workers select the desired option (or none of the above). Additionally or alternatively, the users may be presented with a plurality of candidate dialogues for a domain that include utterances, responses, and annotations and the user may select a desired candidate dialogue. The dialogue system may retrain the dialogue model 306 based on the selected candidate dialogues that the users deem as most appropriate for the domain. The process then repeats by showing the prefix of the annotated dialogues and asking the users/workers to continue the conversation, selecting a subset, annotating that subset, and so on, until the conversations finishes (as determined by the annotators or the model) or some number of iterations occur. This process provides noisy distant supervision to retrain and expand the automated dialogue system.

In some instances, the automated dialogue system may not utilize remote workers to retrain and expand the automated dialogue system. Rather, the dialogue system can execute one or more models to reduce a large number of utterances into a small subset of utterances. Additional models or logic may be used to then select the next utterance for the dialogue. In some instances, the dialogue system can be trained to repetitively reduce the number of utterances in the subset until an utterance is selected. Alternatively, the model may be trained over time to reduce the large number of utterances into a selected utterance.

To encourage coverage, the dialogue system can collect paraphrases via data collection using the paraphrase module 270. More information for paraphrase collection is described in U.S. patent application Ser. No. 15/804,093, the contents of which is hereby incorporated herein by reference for all purposes. The dialogue system generates a set of canonical utterances with known logical representations (e.g., I want to depart 7/10). Canonical utterances may come from the collected dialogues themselves or other explicitly human-annotated utterances. If the dialogue system has a knowledge base of known entities and (possibly) relations (e.g., Airbnb amenities, colors, major cities), these can also be used as canonical utterances. Once the dialogue system has generated these utterances, the dialogue system then presents the utterances to annotators for paraphrasing. These annotators need not be the same annotators that create dialogues from scratch, and may instead be "crowd-sourced" either from users or remote workers from a service like Amazon Mechanical Turk. Annotators may be presented with the utterances in isolation, or they may be presented with neighboring utterances from a surrounding dialogue, along with potentially other contextual information (e.g., when the dialogue was generated, or the location of the user or users). In this way, the dialogue system can gather both context-independent paraphrases (e.g. "I want to depart 7/10"->"I want to depart the seventh of July") or context-dependent paraphrases ("I want to depart 7/10"->"I want to depart that Monday"). In addition, the dialogue system may be configured to request that crowd-sourced annotators create nearby negative examples ("I want to depart that Monday" -/->"I want to depart next Monday"), which are minimal pairs—two sentences which are lexically very similar, but have different meanings. The purpose of such requests is to provide a stronger signal to the learning algorithm. The work done by this task may be error-prone, so the dialogue system may create a third task in which annotators are presented with a mixture of both positive and negative examples and asked to judge each candidate paraphrase as either valid or if not valid, fix the candidate paraphrase to provide additional training examples.

There are two ways in which the paraphrase data can be incorporated by the paraphrase module 270: The simplest way is to use the positive examples on existing annotated dialogues to augment the training data by substituting the original sentences with the existing paraphrases. However, this method limits the paraphrases that the dialogue system can train from to ones of the existing annotated dialogues. Second, the dialogue system can define an auxiliary binary classification task for predicting whether two utterances (in context) are paraphrases are not, using the positive and negative data that the dialogue system obtained. A dialogue model contains an embedding of the utterance, which can be used to drive both the auxiliary task as well as the main dialogue prediction task. This multi-tasking objective may use paraphrases of unannotated dialogues and influence the learning of embeddings, providing a better representation for prediction.

The data authoring tool 250 allows administrators to author data for use by the dialogue system. More detail for a suitable data authoring tool is described in U.S. patent application Ser. Nos. 15/904,125 and 15/974,650, the contents of which are incorporated herein by reference for all purposes. Within or in conjunction with data authoring tool 250, an administrator can browse and edit macros. One challenge is that macros are most easily visualized in the context of an example. The dialogue system can, for example, show several examples where a given macro was used. The dialogue system can also provide for visualizing macros and merge templates that are similar, the same, or nearly the same.

The dialogue system typically operates by receiving an utterance, analyzing the utterance, and selecting an action to take based on the analysis. The dialogue system may make a sequence of low level decisions before completing the action, and, in some cases, can lose track of a thread or incorrectly track the process of decisions. Advisor 234 can, at one or more decisions or each decision, consider other decisions or actions to complete or not complete. The dialogue system can determine which advisor to listen to and when, and when to ignore one or more advisors.

Requests contain a list of key-value pairs having values that are constraint values. A user utterance is often used to update request values (e.g., FlightSearch). Constraints map well to declarative nature of intent expressed in natural language, and also provide power over simple or non-complicated slot-filling systems. Constraint language can be close to natural language or closer to an API, providing a tradeoff for design considerations. Being closer to the language means that the mapping from language to the requests and constraints can be easier for a system to learn. Being closer to the API means that the mapping by the inference module is simpler (i.e., less code) and more transparent when something does not go as planned.

There may be several principals that guide the use of constraints. For example, simple and clear logical elements should go into the constraints, and the constraint language should be clearly demarcated. Any soft elements (e.g., resolving "Portland", "late July") can be exposed to the outside so that learning can operate on it in a contextual way. The constraints should be easy to understand and render by annotators, and a constraint solver should be simple and efficient. Further, it should be easy to, when achieving a tradeoff as discussed above, to move closer to or farther away from the API, depending on how much flexibility the system needs. For example, a constraint language can be an adaptation of lambda DCS, rendered more like natural language (Table 1, "Naturalizing a Programming Language via Interactive Learning," Sida I Wang, Samuel Ginn, Percy Liang, Christopher Manning, Computer Science Department, Stanford University). Each constraint can have a type (the same inventory that values have). The type can be one of a string or some entity (e.g., City, Person), a number such as some measurement (e.g., length, duration), a datetime, a geocode (lat, lng), a bounding box (two geocodes), or a circle (Geocode+radius) or other shape. A constraint of type t can be thought of as denoting a set of values with type t. The grammar of constraints can be defined as follows: a primitive value (e.g., Tuesday), set operations: not S|S and . . . and S|S or . . . or S, standard functions: =S|>S|>=S|<S|<=S| contains S| startswith S, binary relations: <relation> is S, and ternary relations: distance to S>=S. Some examples of constraints are indicated as follows: checkin_date: 2017-04-06, checkin_date: 2017-04-06 or 2017-04-07, checkin_date: >=2017-04-06 and <=2017-04-10, checkin_date: day_of_week is not (Sunday or Monday), and parts.[*].layovers.[*].location: not (SFO or OAK).

For constraints involving two properties (e.g., checkin_date<checkout_date−3), the dialogue system can create derived attributes like stay_duration=checkout date−checkin_date, and constrain stay_duration>3. Derived attributes can be defined by a separate list of (path, macro) pairs, which can be edited by annotators. For example, the separate list of pairs can include: (total_duration, compute_total_duration).

In some instances, actions can be taken to resolve questions or simple tasks that can be resolved outside the request. Resolving things extensionally outside the request whenever possible allows the dialogue system to place some procedural control over the request. For example: for "3 days before Labor Day" or "the weekend", the dialogue system can resolve to a concrete date, and then just stick it in. Similarly, for phrases of "I want to fly to some city in California" or "fly to Chicago" or "morning"; the dialogue system actions should fetch the cities, airports, time ranges, or the popular cities or ask for clarification, or indicate that the dialogue system does not want to do that inside the constraint solver.

There are motivations for using the dialogue system. For example, there's more flexibility in building these up, especially if user interaction is required. Further, it's more transparent to an annotator what's going on. The dialogue system also simplifies the inference engine and exposes more things to learning.

The dialogue system can handle preferences for constraint values such as large and small. For example, if someone asks for a 'cheap(est) flight that gets in the latest but not after 3 PM', then the dialogue system may order by some function of price and arrival time. A constraint may be conjoined with tags of 'large' or 'small.' Note that in general, annotators might specify multiple criteria, so it's not just a simple argmax. Examples include 'price:small' and 'arrival_time; large and =+15:00.'

The inference module can try to pick a reasonable default (based on the declarative priorities of the various fields), just as long as some form of intent is accepted/stored, so that the dialogue manager actions later can depend on it. For example, talking about 'arrival_time' or giving cheapest price, etc.

Sometimes, it's advantageous to be able to accept/store a constraint even if the dialogue system can't interpret it logically because it captures the intent. For example, a user may input speech that says: 'I want to fly to California.' In this case, the dialogue system cannot resolve California into an airport code in one step, but the dialogue system might want to record/store it so that generation can function. To do this, the dialogue system adds a small set of future constraints: FlightSearch: destination: ~California and not LAX. These future restraints are basically non-operations by the inference module, but just like preferences above, they allow the dialogue system to record/store the intent. This allows the dialogue system to have a generation rule that does implicitly confirm: "Ok, to somewhere in California." Later, when California gets resolved, a plurality of searches may be conducted within the constraint of '~California'. For example, for a user and search: user: want airbnb near a BART station and a japanese restaurant, AirbnbSearch: location: ~BART station and ~japanese restaurant. In another Example, user: want airbnb near a 4 star japanese restaurant open on Sundays. In this case, the dialogue system would create a PlaceSearch structured value. The dialogue system can't put the structured value directly into the constraint, but can create an ID, which the dialogue system puts into the constraint. This causes indirection and complication. Note that if the dialogue system had resolved California earlier, the dialogue system would have put in the resolved airport directly into destination. In some instances, the dialogue system can still keep track of the provenance of California from a dataflow graph. For ad-hoc computations (e.g., "What's the hottest it will be in Portland?"), there's no evident place to resolve "Portland". Hence, the dialogue system could either just add a place holder at the top-level state, so that it is localized to that sentence. Later, the dialogue system can interpret that sentence by telescoping to the place holder points.

Constraints, in some instances, can be relaxed and need not be treated as hard constraints. For example, a 12:05 PM flight might be okay for a morning flight, but if a user asks for an earlier flight, getting one that leaves one minute earlier may be not satisfactory. If there are no results, then the dialogue manager will want to suggest other options (e.g., if the user is willing to have a layover, then ..., if you are willing to take another airline, then ... ). This means that the inference module should be able to do a broader search. In some instances, annotators can build up these constraints procedurally using basic functions (constraints are values that can be operated on by actions too), such as but not limited to the following functions: and_constraint(c1, c2): "before 3 PM", "also after 1 PM, " or_constraint(c1, c2): "add OAK," and remove_constraint(c1, c2): "remove OAK." Annotators can also use autocomplete (e.g., simply type "after 1 pm", "also after 1 pm") to fill in most constraints.

At a high-level, the dialogue task is to predict the sequence of actions given the dialogue so far and the next user input utterance. All the information is accessible, so in principle given enough data, the dialogue system should be able to predict the sequence of actions. However, the dialogue so far includes a lot of information and content, and the dialogue system needs some inductive bias to tell the model what to look at. This inductive bias can be thought of as imposing a notion of locality, and can determine at the current point in time, what about the whole dialogue is exposed as possibly relevant. The most obvious form of locality is recency: utterances and values that occur in the last turn are more likely to be relevant. With requests, even though the user might have specified the flight destination 10 turns ago, the destination is put in the request object, which keeps on getting mutated. Thus, by virtue of grouping information into structured values, things which might otherwise be far are actually local.

A more subtle form of locality comes from the fact that the structure of dialogue is hierarchical: the user might ask about the weather in Portland, and then proceed to have a side conversation about resolving which Portland, and then the dialogue manager should finally pop back up to the top and issue the weather query on the chosen Portland. Here, the dialogue system can look to the dataflow graph to quickly trace back to the original utterance that asked about the weather. The dialogue system calls this telescoping, which zooms in on the relevant utterances, which are deemed local by virtue of being connected via dataflow.

The "dataflow graph" for a dialogue trace is similar in spirit to the control flow graphs commonly used in a programming language compiler. Each action has a set of input actions, and the dataflow graph is just the graph induced by treating each action as a node with edges from each of its inputs.

Another form of inductive bias has to do with the high-level intent: while the actions capture what is done, they don't capture why things are done. For example, what question should the dialogue manager ask next? Why, after resolving "Dan" and getting his phone number should the dialogue system text him "Be there in 5"? In these cases, there morally exists some intent structure on top of the actions.

At this point, there can be a number of possibilities. First, the dialogue system can heuristically impute it (multiple candidates permitted). This injects strong inductive bias (e.g., whenever there is a just-completed search, it's result needs to go back to the previous uncompleted search). In many cases, it shouldn't be hard to heuristically identify the relevant requests and use typing information to figure out their connections. Alternatively, the dialogue system can consume post-hoc annotations of intent, where an annotation is a structured value marking one or more actions with a label. Importantly, the dialogue can be constructed without concern about this annotation. A third alternative available to the dialogue system is to model intent as a latent variable. This potentially makes learning difficult unless it is a "mild" latent variable, one whose value isn't that hard to guess.

In some instances, it can be desirable to use one or more, or all three, of the discussed methods. The motivation behind advisors is that the bulk of intent structure can be easily imputed. If this is not enough and the dialogue system can formulate a clear annotation task, the dialogue system can get additional information. Finally, with all this information, the dialogue system can model a latent variable for the cases where imputation failed, and annotation was unavailable, hoping that the latent variable is now mild with information.

Advisors provide a bottom-up approach of imputing intent. An advisor is a module that looks at the dialogue so far and outputs advice that the model can make use of. In this way, advisors play the same role as features play in traditional machine learning. Advisors need not make a final decision when it is difficult. They can expose the relevant information to learning. Ultimately the data is in charge of what happens. However, some advisors are "dictators" and impose conditions that must be satisfied. Dictators may be used, for instance, to enforce certain business or user experience requirements (e.g., can't book a flight before confirmation). Many advisors can be created based on the multi-faceted aspect of dialogue (see below for examples).

Modularity is important for advisors. The behavior of an advisor can be easily understood and maintained (though the overall behavior of the dialogue manager could be more complex as it must pool together all the information from different advisors). An advisor can be trained on other sources of data (e.g., sentiment), making it possible to leverage existing resources.

Formally, an advisor is a module with an interface that includes inputs and outputs. Inputs may include past state (actions+values+utterances) and proposed state (actions+values). The output may include values (e.g., a set of key-value pairs), some of which are global and some of which are localized to parts of the past and proposed state, kill switch.

The present technology may utilize several advisors, including implicit confirm, connections, business logic, sentiment, and other advisors. The purpose of and examples for exemplary advisors are set forth below.

Implicit Confirm Advisor
Purpose: suggests things to talk about to confirm the state
This advisor looks at what has already been said and reports on what is new in the state. It can compute equalities (e.g., "same price"), so that the dialogue manager can have more pragmatically concise generations.
"What was said" is a bit tricky and relies on the model having an explicit link between the state and generation. This needs to be true to prevent lying (see generation section below).
Example:
 [advisor: destination was filled in last turn]
 dialogue manager: Ok, to Boston (BOS).
Connections Advisor
Purpose: try to autofill values in the request based on other requests (demons in Scarecrow)
Connections between domains are specified declaratively in a JSON file.
Example
 user: I need to leave on Tuesday.
 dialogue manager: Ok, checking out Tuesday.
 [advisor: have Airbnb and flight active which seem like they're part of same trip]
 dialogue manager: Would you like me to change your flight to Tuesday too?
Example
 [state: EmailMessage]
 dialogue manager: Who do you want to send the email to?
 [state: to field is marked] (by generation)
 user: Dan
 [state: ContactSearch]
 dialogue manager: Dan Roth or Dan Klein?
 user: Roth
 [advisor: "to" field was pending, the dialogue system just got a value that could go there]
Business Logic Advisor
Purpose: makes sure that rules are followed.
This advisor depends on rules that are written down in a declarative form
Use cases:
 Ensuring that the dialogue system have verified a user's identity before giving account information
  [advisor: AuthenticationRequest is complete]
 Obtaining explicit confirmation before charging a credit card, canceling reservations. (don't need this, put in UI)
  [advisor: dialogue manager asked to take action (with all details) and user said yes]
  [state: Yes]
Sentiment Advisor
Purpose: checks on the emotional state of the user.
This could be backed by a sentiment classifier that looks at the previous user utterance for words that sound like something bad happened.
Example (customer service)
 user: my laptop got stolen, so I'll need a new one
 [advisor: bad thing happened]
 dialogue manager: I'm sorry to hear that.
Progress Advisor
Purpose: makes sure that the conversation is progressing and not going in circles.
It could also monitor how API calls are doing (if services are down or taking too long).
Example
 dialogue manager: Would you like to book that flight?
 user: no
 dialogue manager: Would you like to book that flight?
 user: no, and leave me alone
 [advisor: asked same question twice (possibly catch earlier)]
 dialogue manager: Oops, looks like I'm going in circles here.
Suggestions Advisor
Purpose: based on the coarse content of the dialogue, make suggestions (e.g., promotions)
Example
 dialogue manager: I've booked that flight on your saved card.
 [advisor: people who book flights also book hotels]
 dialogue manager: Would you like me to look into hotels too?
Example
 dialogue manager: I've found a car for . . .
 [advisor: promotion available]
 dialogue manager: If you buy now, we'll throw in a pony.

A form-filling advisor may ask questions to get a request filled in. Examples of a form filling advisor include an exchange as shown below: dialogue manager: Ok, to Boston (BOS), advisor: FlightSearch's departure_date not filled, dialogue manager: When would you like to leave? At any point in time, there are multiple requests in play, a subset of which haven't been filled. The form-filling advisor finds the request (e.g., based on recency) and the highest priority field in the request to ask about. Request objects can expose constraint-driven completion information to this advisor. Some examples are set forth below: user: I'm thinking of visiting Disneyland, [highlight: Disneyland; optional: tag 'destination'], user: I want to fly from Disneyland to Disneyworld, [state: AirportSearch, location=Disneyland], [state: AirportSearch, location=Disneyworld], dialogue manager: Is any airport near Disneyland okay?, user dialogue manager: Is any airport near Disneyworld okay? // triggered by existence of searches, user: I want an airbnb within 500 feet of a café, [state: AirbnbSearch, location=distance to has type cafe<=500:feet].

The dialogue system may use templates for dialogue generation. Some templates come from the advisors (e.g., "When would you like to leave?"). However, these may not be enough to cover all the cases. Annotators create dialogues with utterances however they want, and templates are mined (e.g., "That flight is non-stop"). The problem is that these aren't always licensed templates. Annotators go over training dialogues where at each point, the dialogue system shows the set of templates that are structurally licensed (ranked by model score). The annotators will mark some of these as good and some as bad. The dialogue system then has annotators create preconditions (e.g., @Flight.stops=0) until all the negative examples are ruled out. This will be done using a specialized UI for browsing/editing/searching over templates. In some instances, users can edit templates (or a cluster of templates), which can automatically propagate to the utterances.

Template induction takes a set of training dialogues and outputs a set of templates. First, the dialogue system takes the dialogue state and runs a one or more conversion and rendering functions (e.g., get_airport, round format1, format2). Next, the dialogue system heuristically aligns the resulting strings with entities in the utterance. The present technology can read out the tokens of the template, with empty preconditions (these are added later).

In some instances, the present technology may need thousands of templates to really cover the space well. Of course, many of these will be similar. The present technology can embed each of these templates, so that the dialogue system shares statistical strength between them. The present technology will also collapse templates that are the same modulo stop words/morphology (a versus an), because these need to get filled in context-dependently anyway. The present technology will further cluster the templates, so that it's easier for annotators to look through templates, and the model can predict the cluster of the template first and then the actual template in a hierarchical softmax fashion.

A macro is a chunk of reusable code that can be used in different situations to automate tasks. Macros behave like functions, but can be dynamically constructed by annotators. Macros provide a layer of abstraction that's closer to the natural language and thus easier for annotators to select (and maintain consistency) and easier for the model to learn to predict. They also provide modularity because the dialogue system can swap out the implementation of a macro (e.g., for city_to_major_airports).

Formally, a macro consists of a name (e.g., city_to_major_airports), a type signature (e.g., City ⇒ List[Airport]), and a body, which is a sequence of actions, where the arguments of call actions can refer to the arguments in the type signature.

Examples of a macros are set forth below:

- def render_airport(airport_code: AirportCode) // Generates "Boston (BOS)"
  - [0]: get_airport(airport_code)
  - [1]: get_city([0])
  - [2]: "("
  - [3]: airport_code
  - [4]: ")"
  - list([1],[2],[3],[4])
- def city_to_major_airports(city: City)
  - [0]: get_airports(city)
  - [1]: [0].[0] // Get the first airport (have different macro for different airports)
- def tomorrow( )
  - [0]: now( )
  - [1]: 1:day
  - [2]: shift([0],[1])
- def no_results(list: List[T])
  - [0]: is_empty(list)
  - [1]: assert([0])
  - [2]: "There are no results."
- def describe_flight(flight: Flight)
  - [0]: "There is a flight for"
  - [1]: flight.price -continued

- [2]: "on"
- [3]: extract(flight.legs.*.carrier)
- [4]: ensure_unique([3])
- list([0],[1],[2],[4])

Some of the actions are "assert", which define the preconditions (they are embedded in the body because some preconditions might require some actions to actually compute the needed values).

A macro is meant to have a crisp semantics. Annotators should be able to browse/edit/create new macros. When the annotator doesn't explicitly use a macro, but rather lays out a sequence of low-level actions, the dialogue system can match the sequence with the body of a macro, and ask the user. This is basically simple plan recognition. In the user interface, macros show up as functions, but annotators can expand them to see the values produced by the actions in their body. If there is a need for the dialogue system to show the values, the dialogue system can carry around the intermediate values that the macro computes rather than just the final return value.

Actions in the body of a macro can refer to other macros (e.g., describe_flight can depend on describe_leg). Macros support if statements by simply having one macro per branch of the if statement (e.g., describe_flight_no_results, describe_flight_same_price, etc.). The dialogue system could allow some of the macro invocations in the body to be underspecified (only specifying the name of the macro, not the actual identity), and let the model choose. This would essentially provide a way of writing down a grammar over possible actions, like ALisp.

During annotation time, a particular macro is chosen that reflects the particular circumstances of that dialogue. But at test time, the dialogue system often would like to swap out a macro for a different one. There are two main cases. First, the macro can correspond to a particular branch (e.g., describe_flight_no_results), but the dialogue system wants to let the dialogue system pick any macro with the prefix describe_flight_*. Second, the macro corresponded to an amateur implementation (e.g., city_to_airports_first), but the dialogue system may want to use a carefully chosen professional implementation (e.g., city_to_airports_official). Note that the replacement might be a function, not a macro. The macro corresponds to a deliberate manufacturing of data (e.g., perform_flight_search_return_no_results) to drive the dialogue somewhere, but the dialogue system can use the real search. Note that this swapping out can happen during the evaluation step during training to see how well the dialogue system can match the annotated output (which might not be even what the dialogue system wants).

Templates are macros with arguments filled in based on a simple rule. The primary application of templates is generation. The desiderata of generation is that it should reflect the actual dialogue state, not just lie and make up facts. The user's utterance might always be misinterpreted, and erroneous actions might be taken, but the dialogue manager needs to be able to reflect the true state. For example, that flight is non-stop. // should only be said when it's true.

At the same time, the dialogue system should provide generation that is fluid and natural, so the dialogue system doesn't want to hardcode a fixed set of templates. Therefore, the proposal is to let annotators write down whatever utterances they choose, automatically induce templates, and then let annotators refine them by adding preconditions. In the end, generation comes exclusively from a (large) set of templates.

Arguments to macros are chosen by the neural model, but a template requires more transparency and locking down. Arguments will be chosen by generalized paths. A generalized path references a value by traversing structured objects, where the indices can use negative indexing, and there is an initial localization (e.g., turns[−3:]). Example: turns[−3:].Flight[−1].slices.[0].legs.[0].departure_date, turns[−3:] selects the last three turns (to localize); default is entire state, Flight[−1] selects the last flight, Syntactic sugar: @X=turns[−3].X, Note that the [−3] is very arbitrary, and can be changed if needed.

Main features include use of negative indexing ([−1]), restricting by type (Datetime*), localization by turns or actions (e.g., turns[−3:], . . . ). A template contains a macro and a list of generalized paths which are the arguments. An example may include: describe_flight(@Flight[−1]). Note that the generalized path is a proxy for a potentially more semantically meaningful quantity (e.g., salience). As such, the recency bias in dialogue will allow the generalized paths to pick up on the right things most of the time. Examples, show inline, are as follows: When would you like to leave? / @FlightSearch[−1].parts.[0].departure_dates=null, There is a flight for ${@Flight[−1].price} on ${@Flight[−1].carrier}, That flight is non-stop. / @Flight[−1].stops=0, and I found a cheaper flight / @Flight[−1].price<@Flight[−2].price.

Figure 4:
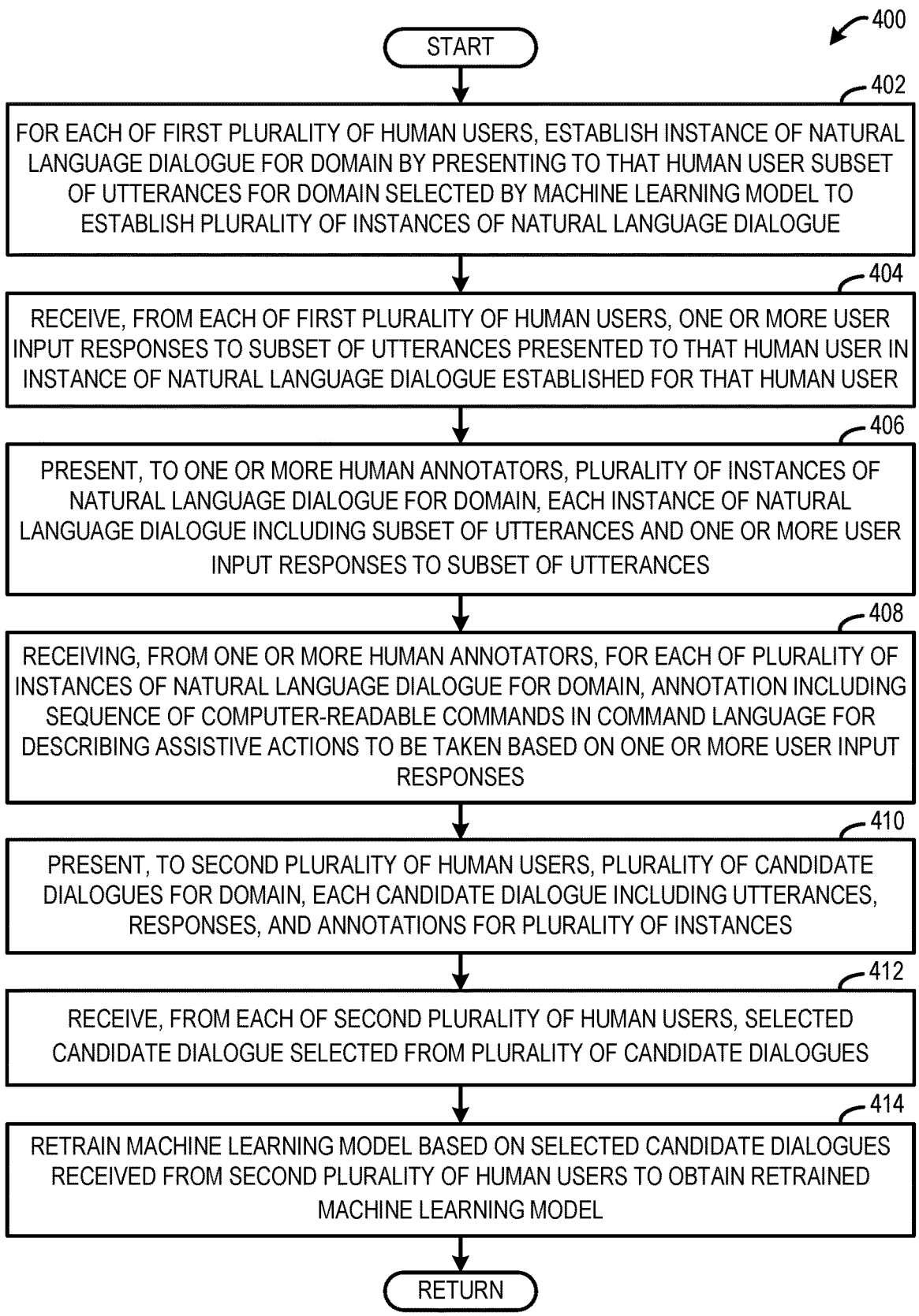
FIG. 4 is a flow chart of an example method for training a machine learning model for natural language interaction.

These features are discussed in more detail through the discussion of FIG. 4 below, which shows a flowchart illustrating a respective example method 400. Method 400 may be performed by a computing system to train a machine learning model for natural language interaction. The method 400 illustrated in FIG. 4 may be performed on any suitable device, including but not limited to dialogue manager 114 and/or computing system 500 described below. One or more logical machines (e.g., dialogue manager 114) may be configured to perform the method 400 illustrated in FIG. 4. As a non-limiting example, aspects of method 400 may be implemented by a logic subsystem executing instructions stored in a storage subsystem as described in further detail with reference to FIG. 5.

At 402, method 400 includes, for each of a first plurality of human users, establishing an instance of a natural language dialogue for a domain by presenting to that human user a subset of utterances for the domain selected by the machine learning model to establish a plurality of instances of the natural language dialogue.

Different human users of the first plurality of human users may be each presented with duplicates of the same subset of utterances for the domain, each presented with a different subset of utterances for the domain, or presented with any suitable combination of duplicate and/or different subsets of utterances for the domain.

At 404, method 400 includes receiving, from each of the first plurality of human users, one or more user input responses to the subset of utterances presented to that human user in the instance of the natural language dialogue established for that human user.

At 406, method 400 includes presenting, to one or more human annotators, the plurality of instances of the natural language dialogue for the domain, each instance of the natural language dialogue including the subset of utterances and the one or more user input responses to the subset of utterances.

Different human annotators may be each presented with duplicates of the same instance of natural language dialogue, each presented with a different instance of natural language dialogue, or presented with any suitable combination of duplicate and/or different instances of natural language dialogue.

At 408, method 400 includes receiving, from the one or more human annotators, and for each of the plurality of instances of the natural language dialogue for the domain, an annotation including a sequence of computer-readable commands in a command language for describing assistive actions to be taken based on the one or more user input responses.

At 410, method 400 includes presenting, to a second plurality of human users, a plurality of candidate dialogues for the domain, each candidate dialogue including utterances, responses, and annotations for the plurality of instances.

Different human users of the second plurality of human users may be each presented with duplicate pluralities of candidate dialogues, each presented with a different plurality of candidate dialogues, or presented with any suitable combination of duplicate and/or different pluralities of candidate dialogues.

The first plurality of human users, one or more human annotators, and second plurality of human users may each include any human users who are able to provide responses in natural language dialogue, e.g., end users, workers, system administrators, etc. The first plurality of human users, the human annotators, and the second plurality of human users may be disjoint or may overlap in any suitable fashion. As a non-limiting example, the same human may be one of the first plurality of human users, a human annotator, and one of the second plurality of human users. As another non-limiting example, the first plurality of human users and second plurality of human users may be overlapping, while the human annotators are a disjoint set of humans so that no human annotator is also one of the first plurality of human users or one of the second plurality of human users.

At 412, method 400 includes receiving, from each of the second plurality of human users, a selected candidate dialogue selected from the plurality of candidate dialogues.

At 414, method 400 includes retraining the machine learning model based on the selected candidate dialogues received from the second plurality of human users to obtain a retrained machine learning model.

The above described method allows for data annotation to be scalable while allowing data collection to be decoupled from model building. The method may be performed to collect a large number of dialogues in parallel that may be annotated and evaluated to expand on the capabilities of the dialogue system.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
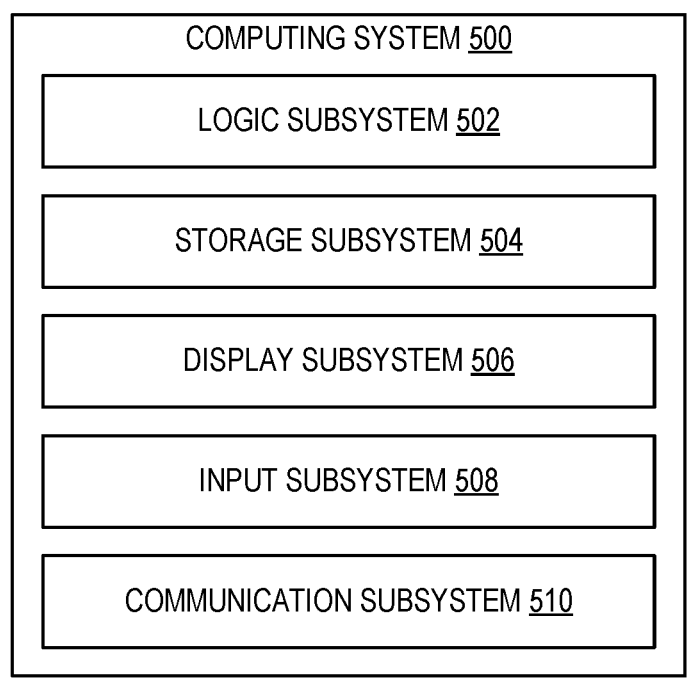
FIG. 5 is a block diagram of an example computing system.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices or combinations thereof. As one example, computing system 500 may implement at least a portion of dialogue manager 114. Client device 110, mobile device 120, computing device 130, network server 150, application server 160, data store 170, and/or administrator device 180 may take the form of an implementation of computing system 500.

Computing system 500 includes a logic subsystem 502 and a storage subsystem 504. Computing system 500 may optionally include a display subsystem 506, input subsystem 508, communication subsystem 510, and/or other subsystems not shown in FIG. 5.

Logic subsystem 502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program-and application-specific integrated circuits (PASIC/ASICs), program-and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to hardware and any software, instructions, modules, and/or other components cooperating with such hardware to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application or module) cooperating with a remote component (e.g., cloud computing service). The software and/or other instructions that give a particular machine its functionality are referred to as modules. The modules may communicate with each other as being on the same machine or on different actual or logic machines. For example, the dialogue manager is a logic machine that may include one or more different computers cooperatively configured to provide the functionality described herein. Network browser 132, application 112, mobile application 122, application 162, and dialogue model 306 may also be implemented as logic machines. The one or more logic machines may be implemented via any suitable combination of computer devices described in the present disclosure, e.g., by executing instructions stored on one or more storage devices of the computer devices, at one or more processors of the computing devices. For example, the one or more logic machines may be implemented via any suitable combination of computing devices of computing system 100, including client device 110, mobile device 120, computing device 130, network 140, network server 150, application server 160, datastore 170, and/or administrator device 180. Alternately or additionally, the one or more logic machines may be implemented via any suitable combination of remote worker server 310, cloud worker platform 312, remote worker devices 304, annotation server 308, annotator devices 302, and/or computing system 500.

Modules and machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more modules and/or machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., Markov models, Markov random fields, (hidden) conditional random fields, and/or AI knowledge bases), and/or natural language processing techniques (e.g., tokenization, stemming, constituency and/or dependency parsing, and/or intent recognition, segmental models, super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 506 may be used to present a visual representation of data held by storage subsystem 504. This visual representation may take the form of a graphical user interface (GUI). Display subsystem 506 may include one or more display devices utilizing virtually any type of technology. In some implementations, display subsystem may include one or more virtual-, augmented-, or mixed reality displays.

When included, input subsystem 508 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 510 may be configured to communicatively couple computing system 500 with one or more other computing devices. Communication subsystem 510 may include wired and/or wireless communication devices compatible with one or more different communication protocols. The communication subsystem may be configured for communication via personal-, local- and/or wide-area networks.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system for training a machine learning model for natural language interaction, the method comprising:

establishing a plurality of instances of a natural language dialogue for a domain, each instance of the natural language dialogue including a subset of utterances for the domain selected by the machine learning model;

for each instance of the natural language dialogue for the domain, receiving one or more input responses;

for each instance of the natural language dialogue for the domain, selecting a pre-defined template from a library of pre-defined templates based on the one or more input responses, the selected pre-defined template including an assistive action and one or more generalized paths;

receiving for each selected pre-defined template, one or more sanitizing constraints that refine the one or more generalized paths, the one or more sanitizing constraints used in execution of the assistive action by a computing device to return one or more values that advance the natural language dialogue based on the one or more input responses;

receiving one or more selected candidate dialogues selected from a plurality of candidate dialogues for the domain, each candidate dialogue including utterances, responses, a selected pre-defined template, and one or more sanitizing constraints corresponding to the selected pre-defined template; and retraining the machine learning model based on the one or more selected candidate dialogues to obtain a retrained machine learning model that is trained to recognize that a future natural language dialogue corresponds to one of the one or more selected candidate dialogues and select assistive actions described by annotations for that selected candidate dialogue.

2. The method of claim 1, wherein different instances of the natural language dialogue include different subsets of utterances for the domain.

3. The method of claim 1, wherein the natural language dialogue is configured to provide assistance with completing a task within the domain.

4. The method of claim 1, wherein the plurality of instances of the natural language dialogue are established in parallel.

5. The method of claim 1, wherein the one or more input responses include an utterance.

6. The method of claim 1, wherein the assistive actions to be taken in response to the one or more input responses include one or more of a primitive action that returns a value, a call action that includes a function and a list of arguments, and a macro action that includes a sequence of actions performed to automate a task.

7. The method of claim 1, wherein the machine learning model selects subsets of utterances corresponding to the plurality of instances of the natural language dialogue for the domain to expand capabilities of the machine learning model in the domain.

8. The method of claim 1, wherein the one or more selected candidate dialogues are selected as being most accurate in light of the domain.

9. The method of claim 1, wherein the retrained machine learning model is configured to select from a smaller set of utterances for an instance of a natural language dialogue for the domain than that of the machine learning model.

10. A computing system comprising:
one or more logic machines; and
one or more storage machines holding instructions executable by the one or more logic machines to:
establish a plurality of instances of a natural language dialogue for a domain, each instance of the natural language dialogue including a subset of utterances for the domain selected by the machine learning model;

for each instance of the natural language dialogue for the domain, receive one or more input responses;

for each instance of the natural language dialogue for the domain, select a pre-defined template from a library of pre-defined templates based on the one or more input responses, the selected pre-defined template including an assistive action and one or more generalized paths;

receive for each selected pre-defined template, one or more sanitizing constraints that refine the one or more generalized paths, the one or more sanitizing constraints used in execution of the assistive action by a computing device to return one or more values that advance the natural language dialogue based on the one or more input responses;

receive one or more selected candidate dialogues selected from a plurality of candidate dialogues for the domain, each candidate dialogue including utterances, responses, a selected pre-defined template, and one or more sanitizing constraints corresponding to the selected pre-defined template; and retrain a machine learning model based on the one or more selected candidate dialogues to obtain a retrained machine learning model that is trained to recognize that a future natural language dialogue corresponds to one of the one or more selected candidate dialogues and select assistive actions described by annotations for that selected candidate dialogue.

11. The computing system of claim 10, wherein different instances of the natural language dialogue include different subsets of utterances for the domain.

12. The computing system of claim 10, wherein the natural language dialogue is configured to provide assistance with completing a task within the domain.

13. The computing system of claim 10, wherein the plurality of instances of the natural language dialogue are established in parallel.

14. The computing system of claim 10, wherein the one or more input responses include an utterance.

15. The computing system of claim 10, wherein the assistive actions to be taken in response to the one or more input responses include one or more of a primitive action that returns a value, a call action that includes a function and a list of arguments, and a macro action that includes a sequence of actions performed to automate a task.

16. The computing system of claim 10, wherein the machine learning model selects subsets of utterances corresponding to the plurality of instances of the natural language dialogue for the domain to expand capabilities of the machine learning model in the domain.

17. The computing system of claim 10, wherein the one or more selected candidate dialogues are selected as being most accurate in light of the domain.

18. The computing system of claim 10, wherein the retrained machine learning model is configured to select from a smaller set of utterances for an instance of a natural language dialogue for the domain than that of the machine learning model.

19. A method performed by a computing system for training a machine learning model for natural language interaction, the method comprising:

establishing a plurality of instances of a natural language dialogue for a domain, each instance of the natural language dialogue including a subset of utterances for the domain selected by the machine learning model to expand capabilities of the machine learning model in the domain;

for each instance of the natural language dialogue for the domain, receiving one or more input responses;

for each instance of the natural language dialogue for the domain, selecting a pre-defined template from a library of pre-defined templates based on the one or more input responses, the selected pre-defined template including an assistive action and one or more generalized paths;

receiving for each selected pre-defined template, one or more sanitizing constraints that refine the one or more generalized paths, the one or more sanitizing constraints used in execution of the assistive action by a computing device to return one or more values that advance the natural language dialogue based on the one or more input responses;

receiving one or more selected candidate dialogues selected from a plurality of candidate dialogues for the domain, each candidate dialogue including utterances, responses, a selected pre-defined template, and one or more sanitizing constraints corresponding to the selected pre-defined template; and retraining the machine learning model based on the one or more selected candidate dialogues to obtain a retrained machine learning model that is trained to recognize that a future natural language dialogue corresponds to one of the one or more selected candidate dialogues and select assistive actions described by annotations for that selected candidate dialogue.

20. The method of claim 19, wherein the one or more selected candidate dialogues are selected as being most accurate in light of the domain.

* * * * *